United States Patent [19]
Kampf

[11] 3,792,825
[45] Feb. 19, 1974

[54] CHART DRIVE SYSTEM
[75] Inventor: Richard S. Kampf, Costa Mesa, Calif.
[73] Assignee: Beckman Instruments, Inc., Fullerton, Calif.
[22] Filed: Jan. 17, 1972
[21] Appl. No.: 218,397

[52] U.S. Cl. ............................ 242/67.3 R, 346/136
[51] Int. Cl. ..................... B65h 17/02, G01d 15/29
[58] Field of Search .......... 242/67.3, 67.2; 346/136

[56] References Cited
UNITED STATES PATENTS

| | | | |
|---|---|---|---|
| 1,551,415 | 8/1925 | Marcellus | 242/67.3 R |
| 2,556,812 | 6/1951 | Jordan | 346/136 |
| 2,524,564 | 10/1950 | Gorham | 226/196 |
| 2,845,232 | 7/1958 | Johnson | 242/67.2 |
| 2,693,917 | 11/1954 | Kindler | 242/67.2 |
| 3,154,368 | 10/1964 | Daigler | 346/145 X |
| 3,113,823 | 12/1963 | Phillips | 346/136 |
| 2,796,317 | 6/1957 | Valenti | 346/136 |
| 3,281,090 | 10/1966 | Baronowski | 242/67.3 R |

Primary Examiner—George F. Mautz
Assistant Examiner—Edward J. McCarthy
Attorney, Agent, or Firm—Paul R. Harder; James M. Thomson; Robert J. Steinmeyer

[57] ABSTRACT

A chart drive system adapted for use with a multichannel recorder. A spring retainer array is provided for holding and dispensing a chart from a chart supply roll. The chart is trained from the supply roll over a two-speed drive roll provided with multiple spaced-apart drive belts, including a center control belt having teeth thereon adapted to engage perforations in the chart. A writing platen is positioned beneath the chart downstream of the drive roll and pivotably attached to the drive roll. A take-up roll is positioned inwardly of the writing platen, adapted to be driven by a motor through a slip clutch so that the take-up roll tension balances back tension on the chart with respect to the supply roll. Paper guides are provided beneath the chart at the ends of the drive roll.

4 Claims, 4 Drawing Figures

CHART DRIVE SYSTEM

BACKGROUND OF THE INVENTION

The present invention relates to a chart drive system that is especially adapted for use with a multi-channel chart recorder. More particularly the invention concerns such a chart drive system wherein the chart is moved under uniform tension without excessive wander with respect to the recording means, so that recording errors due to the chart transport system are reduced.

Direct writing strip chart recorders are widely used in industry in conjunction with process control systems and other instruments where it is desired to make a continuous log of the measured output of a parameter. Such recorders utilize either pressure sensitive or electro-sensitive paper, or pen and ink systems operated by servo control systems responsive to the measured parameters of the system. In all cases, the recorders generally utilize a chart drive system for moving the chart with respect to writing instruments positioned in one or more channels of the recorder. Thus the strip chart drive system serves to dispense, continuously, the chart from a supply roll, to train the chart past a writing station, and then to restore the chart, such as upon a take-up roll.

Errors in direct writing recorders can result from inaccuracies in the pen servo system, in the chart paper and printing thereon, in the chart transport system, and in the calibration of the overall system, Therefore, in order to achieve satisfactory results, it is desirable to minimize the errors occurring in the chart transport system, as well as any errors the chart transport contributes to other parts of the overall system.

Errors directly occurring in chart transport systems sometimes result from wander of the chart paper back and forth with respect to the drive roll. Such errors can be due to end shake in the drive roll or loose fitting sprocket holes and sprocket teeth. Error can also occur in the chart drive system due to uneven back tension on the paper, as well as nonuniform drive tension across the width of the chart. Such errors occur particularly with pressure sensitive paper systems since they require high stylus pressure and correspondingly higher paper tension. In addition to such errors, any error which occurs in the chart due to variations in the position of grid lines printed on the chart, or humidity caused changes in size of the chart paper, can be minimized by the use of a properly designed chart drive system.

SUMMARY OF THE INVENTION.

Accordingly, it is a general purpose of this invention to provide a simple, low cost chart drive system which can be easily used by an operator. In addition it is envisioned that the chart drive system described will be able to store an adequate supply of chart paper on a supply roll and continuously dispense the chart paper therefrom while the system maintains adequate and uniform back tension on the chart paper. In addition it is envisioned that the chart drive system will drive the chart paper at one of two predetermined speeds past a recording station, and will enable the operator to view the recordings upon the chart after it leaves the recording station. Furthermore, the chart drive system will include a back-up surface or platen for the chart over at least a portion of its movement so that an operator can view the chart or write upon the chart, and the system will otherwise include means for restoring the chart paper.

These purposes are attained in a chart drive system that is especially adapted for use with a multi-channel chart recorder. The chart used in the system is to be stored upon a supply roll which is held in a spring retainer, adapted to handle rolls of different sizes and to dispense chart paper therefrom. The chart is trained along a continuous reach from the supply roll over a two-speed drive roll provided with multiple, spaced-apart drive belts having teeth adapted to engage perforations formed in the chart. A control belt is centered with respect to the chart to minimize the errors arising from the chart expansion. The drive roll is adapted to move the chart paper past a recording station and over a platen, which is positioned under a portion of the chart so that the operator can view and write upon the chart after it passes the recording station. The platen is pivotably attached to the ends of the drive roll whereby it can be pivoted upwardly to provide access to take-up roll positioned inwardly of the writing platen. The take-up roll is motor driven, through a slip clutch, so that the chart can be selectively unrolled off of the take-up roll and rewound without disturbing the positioning of the portion of the chart located in the recording station. Paper guides are provided at each end of the drive roll, positioned beneath the paper, to cause the paper to conform to the curvature of the drive belts to eliminate any looseness of the chart paper over the ends of the drive roll.

BRIEF DESCRIPTION OF THE DRAWINGS

These and other features and objects of the invention will become apparent from the following detailed description of the invention, when considered with the accompanying drawings wherein.

DETAILED DESCRIPTION OF THE INVENTION

Figure 1:
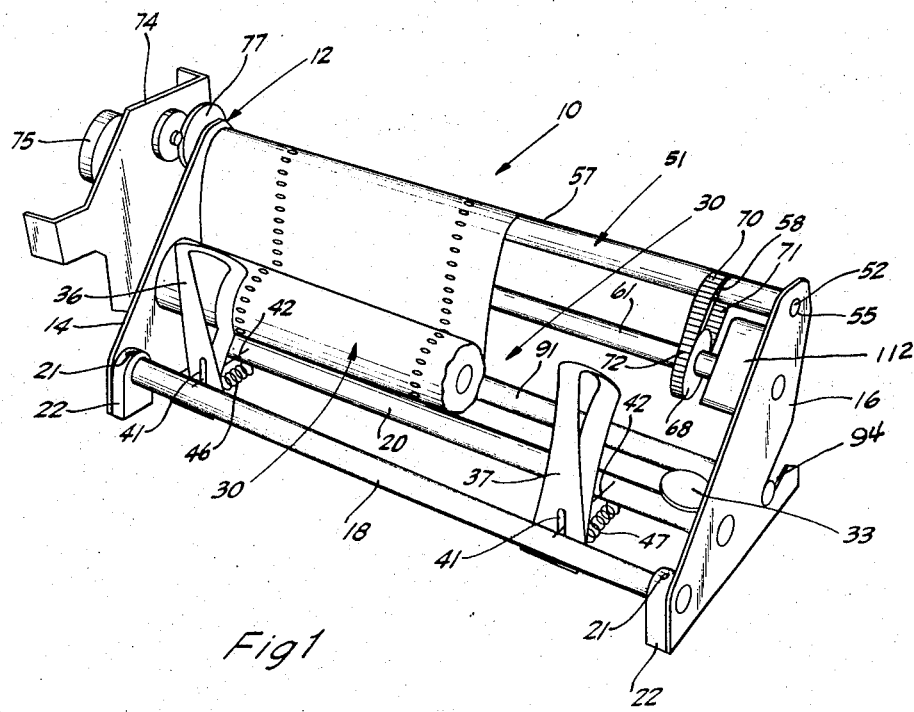
FIG. 1 is a perspective view of one embodiment of the invention with the chart paper partially broken away.

Referring now to the drawings and particularly to FIG. 1, a chart drive system 10 is generally illustrated comprising a frame 12 including spaced apart end plates 14, 16 rigidly joined together by cross members 18, 20. The end plates can be fabricated of any suitable material, such as light metal or plastic and are of suitable dimension to provide the necessary strength to support the other components of the system. The outline of the end plates is generally countoured in the embodiment illustrated, to provide mounting locations for all of the components of the system beneath the peripheral outline of the end plates, although this is not essential. Cross members 18, 20 are likewise fabricated of metal or plastic and are secured to the end plates by any suitable means, such as by rivets 21 extending through collars 22 formed in the end plates, adapted to receive the ends of the cross members.

Figure 2:
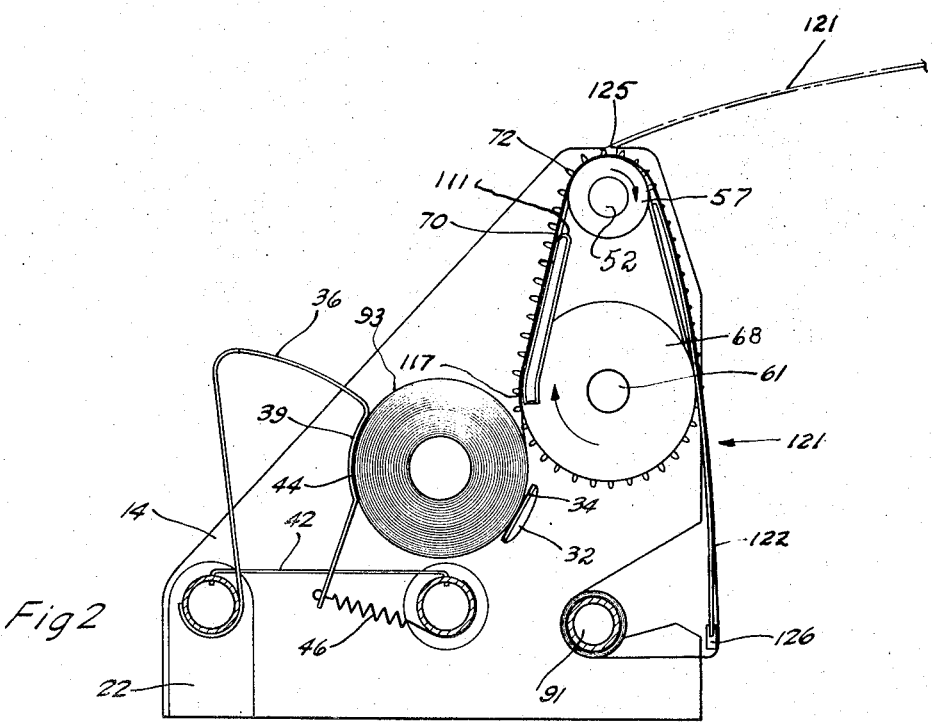
FIG. 2 is an end view, in section, of the embodiment illustrated in FIG. 1.
Figure 3:
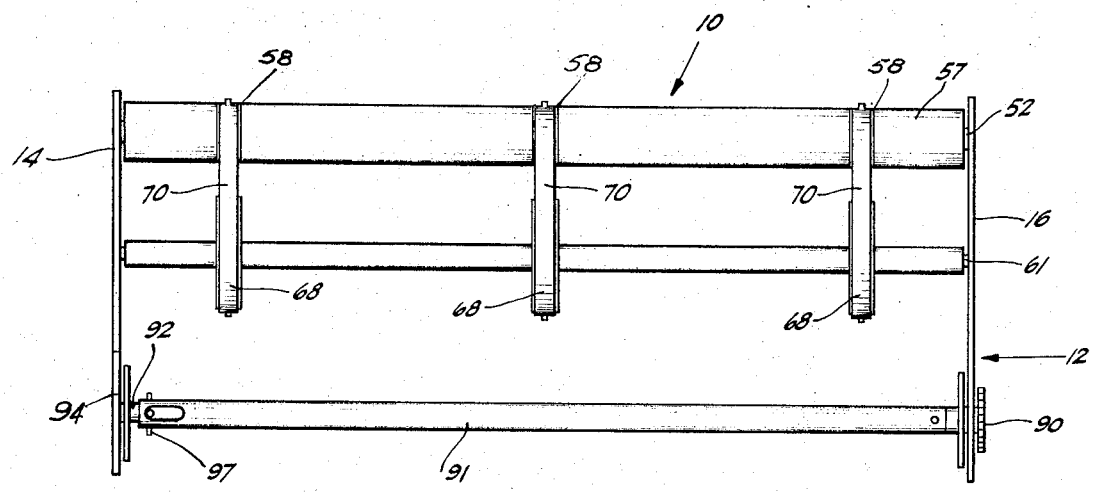
FIG. 3 is a front view of the embodiment illustrated in FIG. 1 with the writing platen omitted.
Figure 4:
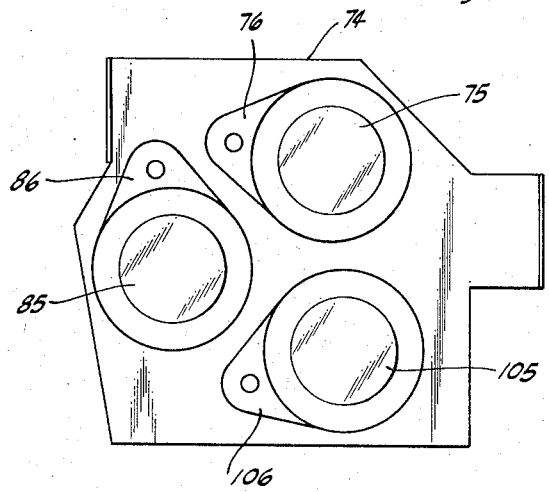
FIG. 4 is a partial end view of the embodiment illustrated in FIG. 3.

A supply roll station 30 is defined between the end plates at the rear of the chart drive system, including a pair of pads 32, 33 secured, respectively, to end plates 14, 16. Pads 32, 33 are each oriented at an angle with respect to the chart roll as best seen in FIG. 2, for a purpose described hereinafter. The pads are preferably formed of metal or other suitable material, and each has a coating 34 of a soft resilient material, such as foam rubber.

The supply roll station otherwise includes a pair of inverted, U-shaped spring members 36, 37 secured to cross member 18. The spring members are spaced apart and located substantially opposite to pads 32, 33, respectively. Each spring member has one relatively straight, fixed side and a movable side having a curved section 39 formed therein, adapted to generally match the curvature of a cylindrical chart roll such as roll 93 adapted to dispense chart paper. In addition, the lower ends of the spring members have slots 41 formed therein, adapted to engage wire guides 42 extending between cross members 18, 20. Accordingly, movement of the free end of the spring member is possible to retain force on the supply roll and clamp it in the chart drive as the supply roll diameter decreases. To provide additional force, tension springs 46, 47 are connected between the lower end of members 36, 37 and cross member 20. The surfaces of spring members 36, 37 that are adapted to face the supply roll are coated with a coating 44 of Teflon or some other material having a low coefficient of friction.

A drive roll 51 is illustrated supported between end plates 14, 16. The drive roll includes an inner shaft 52 rotatably supported in bearings 54, 55 that are secured in suitable openings in the end plates. In addition the drive roll includes a cylindrical outer portion 57 secured to shaft 52 extending the full width of the chart. Portion 57 is formed with three spaced-apart sets of gear teeth 58 formed or idented therein. One set of gear teeth is located at the center of portion 57 of the drive roll and each of the other sets of gear teeth is spaced inwardly from one of the opposite ends of portion 57.

An idler shaft 61 is provided, supported between end plates 14, and 16 secured to the end plates. The idler shaft is positioned at a location just beneath and vertically aligned with the drive roll shaft. Three idler pulleys 68 are rotatably secured on shaft 61, spaced at locations corresponding to the locations of drive gear teeth 58. Each of the pulleys is of identical diameter, and the diameter is selected to be slightly larger than the diameter of outer portion 57 of the drive roll. A drive belt 70 is provided for each drive gear 58 and pulley 68. Each drive belt is a continuous flexible belt having teeth 71 formed on an inner surface thereof adapted to match and engage the corresponding teeth of gear 58. In addition each drive belt has teeth 72 protruding in an aligned pattern from the outer surface thereof, adapted to engage corresponding perforations in the chart paper so that the drive belt, when rotated, serves to move the chart paper through the chart drive system. Since the outline of the belts 70 and pulleys 68 extend slightly beyond the edge of the chart roll as shown in FIG. 2, the belts firmly engage and drive the chart paper even when the supply roll is nearly depleted.

Gears 58 and drive belts 70 are of substantially corresponding width so that the drive belts do not wander with respect to the ends of the drive roll. Furthermore, the teeth of the center drive belt designated as the control belt are sized to engage the perforations in the chart without excessive tolerance. Accordingly the chart paper is not able to wander back and forth on the drive roll during movement thereof. However, the chart paper is provided with elongate slots at the end locations, corresponding to the end drive belts. Consequently, as the width of the chart expands or contracts, due to humidity of temperature changes, the chart still fits the reach between the end drive belts. Furthermore, since the center drive belt is used as the control belt, any side movement of the chart with respect to the drive belts and stylii of the recorder is divided into two equal components. This has the effect of reducing the chart error due to such expansion by a factor of two.

A synchronous motor 75 is mounted upon a platform 74 secured to end plate 14, and a conventional overruning clutch 76 is provided for transferring motive power from motor 75 to shaft 52 through a conventional gearing system 77. In addition a synchronous motor 85 is provided along with a conventional overrunning clutch 86 also adapted to provide motive power to shaft 52. Synchronous motors 75, 85 are adapted to operate at different speeds, and the overrunning clutches enable the selection of one or the other of the motor speeds in accordance with the desired chart speed of the system for a given purpose. The use of overrunning clutches enables energization of one of the motors without interference from the non-energized motor.

A cylindrical take-up roll 91 is provided extending between the end plates at a location just beneath the idler shaft. The take-up roll has a suitable diameter to permit the roll to be inserted through the hollow center of a conventional chart supply roll, such as roll 93. The take-up roll is removably suspended with respect to end plate 14, 16. Thus, one end of take-up roll 91 is adapted to releasably engage a rotatable pin 90 extending through end plate 14. The other end of the take-up roll includes a spring loaded extension 92 adapted to fit into a corresponding notch 94 formed in the edge of end plate 16. A pin 97 is provided, extending transversely through the center of roll 91. Pin 97 is adapted to engage a corresponding slot formed in the end of the chart supply roll when roll 91 is inserted therethrough. Accordingly, rotation of roll 91 serves to rotate the chart supply roll and rewind a chart thereon.

A torque motor 105 is also supported on platform 74, operatively connected to pin 90 and roll 91 by a slip clutch 106. Motor 105 provides positive torque for rotating roll 91, with the slip clutch permitting hand rotation of roll 91 in an opposite direction to facilitate unrolling of the chart for various purposes, as is explained hereinafter.

An elongate platen 121 is provided, extending between end plates 14, 16 on the front side of the chart drive system with the chart paper trained thereover. The platen comprises a wide plate 122 having an outwardly extending or slightly convex curvature adapted to support the chart paper and facilitate the movement of the chart paper thereover. The platen can serve as a base for supporting the chart during a recording operation. In addition, the platen permits the operator to view the chart, after recording, and to make hand markings thereon, if that is desired.

To facilitate use of the platen, it is pivotally mounted by end brackets 124, 125, each having one end secured at a respective upper corner of plate 122. The other end of each bracket is pivotally secured to a corresponding end of shaft 52 of the drive roll. Accordingly, the platen can assume a lowered position as illustrated in FIG. 2, with a stop 126 extending from the lower corner of plate 122 being located in engagement with a corresponding edge of end plate 14. In this position the chart can be selectively advanced over the platen and recording operations can be carried out. The platen can also be pivoted or raised to an elevated position, such as that illustrated in dashed outline in FIG. 2. With the platen raised, easy access is afforded to the take-up roll to provide replacement or respooling of the latter. The platen can be easily elevated with the chart paper present, in view of the use of the slip clutch between the take-up roll and its driving motor.

The chart drive system otherwise includes paper guides 111, 112 secured on end plates 14, 16 respectively, at a location just beneath drive roll 51. The paper guides comprise elongate, relatively wide bands of material having rounded edges 117 to prevent hang-up of the chart paper thereon. The guides are secured to the end plates so that the paper guides engage the chart paper trained over the main drive roll. This causes the paper to conform to the curvature of the drive belts and prevents looseness of the chart paper at the ends of the roll whereby recording inaccuracy due to such looseness is eliminated.

In the use of the chart drive system described herein, a supply roll of chart paper is inserted into the supply roll station with the chart paper adapted to unroll from the right side of the roll as viewed in FIG. 2, and the roll rotating in a counterclockwise direction. The spring members tightly engage supply rolls of various sizes, and due to the spring force, maintain a firm grip on the roll as its size decreases due to usage. The provision of a high friction foam rubber coating on pads 32, 33 and a low friction Teflon coating on spring members 36, 37 results in substantially uniform back tension on the roll as the chart paper is dispensed.

In view of the location of pads 32, 33, slightly inwardly of the outer periphery of pulleys 68, good contact is ensured between the drive belts and the chart as the initial point of contact therebetween. In addition, due to the reduced diameter of drive roll 51 with respect to pulleys 68, good contact is maintained as the chart is drawn over the top of the drive roll. The paper guides serve to remove looseness in the chart at the ends of the roll and eliminate any errors caused thereby. Since the drive belts afford good traction with respect to the chart both before and after the chart passes the top of the drive roller and the recording station no additional means are necessary to advance the chart after it leaves the recording station. Consequently the chart drive can be operated without a take-up roll, if desired, with the chart paper permitted to drop down under its own weight.

In the embodiment described the chart is trained over the writing platen and wound upon the take-up roll. The torque provided by motor 105 is not sufficient to overcome the torque provided to the main drive roll. The use of slip clutch 106 permits the writing platen to be withdrawn upwardly so that the take-up roll is easily accessible. In addition it permits an operator to withdraw substantial portions of the chart from the take-up roll for re-examination. After such re-examination, the operator can utilize motor 105 to rewind the loose portion of the chart without interferring with the recording operation.

It should be apparent that the chart drive system described herein is extremely simple in design and inexpensive to construct and use. In addition the drive system enables the storage and use of large chart supply rolls, and the continuous dispensing of charts therefrom with the chart under balanced tension. Furthermore the system provides movement of the chart at one of two predetermined speeds and provides a view of the chart after it leaves the drive roll. Finally the system provides a back-up surface so that the operator may write on the chart in the viewing area, before the paper is respooled on a take-up roll driven through the slip clutch.

All of these features are provided in a chart drive system which is intended to minimize side to side wander of the chart and expansion error with respect to the recording stylii, and eliminate excessive looseness in the chart at the ends of the drive roll. Accordingly, the chart drive system described is especially useful in systems which require multi-channel recording.

I claim:

1. A chart drive assembly including
a frame comprising two end plates secured in spaced opposed relationship by at least one cross member;
a supply roll station on said frame including a pair of pads secured to said frame, a different one of said pads being located adjacent different ones of said end plates and a pair of spring members secured to said frame, a different one of said spring members being spaced from and generally opposed to different ones of said pads, said spring members having a curved section formed therein adapted to generally match the curvature of a cylindrical supply roll and hold said supply roll between said spring members and said pads;
a platen secured upon said frame;
chart drive means rotatably secured upon said frame between said end plates for selectively advancing paper from a supply roll past a recording station and over said platen;
a take-up roll rotatably secured between said end plates proximate said platen for restoring paper from said chart after it passes said recording station; and
take-up roll drive means secured to said take-up roll through a slip clutch.

2. The chart drive assembly of claim 1 wherein said pads are provided with a coating of resilient material having a relatively high coefficient of friction and wherein said spring members are provided with a coating of material having a relatively low coefficient of friction whereby drag is exerted upon the paper as it is dispensed from said roll adjacent said pads.

3. A chart drive assembly including
a frame;
supply roll station means secured upon said frame for resiliently gripping a roll of chart paper and providing a predetermined drag on said roll;
a platen secured upon said frame;
chart drive means secured upon said frame for providing forward tension on said roll to selectively advance paper from said roll past a recording station and over said platen, said drive means including
a drive roll rotatably secured upon said frame, said drive roll having three spaced apart sets of gear teeth formed therein, one set of gear teeth being located at the central portion of said drive roll and different ones of the other sets of gear teeth being spaced inwardly from respective ones of the opposite ends of said drive roll;

a plurality of idler pulleys rotatably supported upon said frame, an idler pulley being spaced from and aligned with each of said sets of gear teeth formed in said drive roll;

a plurality of drive belts, each drive belt being continuously flexible and having teeth formed on the inner surface thereof for engaging respective ones of said idler pulleys and sets of gear teeth formed in said drive roll, each drive belt having chart drive teeth protruding from the outer surface thereof and adapted to engage perforations in the chart paper for driving said paper;

power means secured to said drive roll through an overrunning clutch for operating said chart drive means; and a take-up roll rotatably secured upon said frame for taking up paper from said supply roll station after it passes a recording station.

4. The chart drive assembly of claim 3 wherein the projections extending from the outer surface of the centrally located drive belt are adapted to engage, without play in any direction, perforations formed in said paper and said projections extending from the outer surface of the other of said drive belts being adapted to engage perforations formed in said chart paper without play in the direction of drive but allowing lateral movement of the chart paper with respect thereto.

* * * * *